(12) United States Patent
Uraki et al.

(10) Patent No.: US 7,364,481 B2
(45) Date of Patent: Apr. 29, 2008

(54) JET-PROPELLED WATERCRAFT

(75) Inventors: Mamoru Uraki, Saitama (JP); Hideki Sugiyama, Saitama (JP); Junji Higashiyama, Saitama (JP); Takao Kochi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 11/524,480

(22) Filed: Sep. 21, 2006

(65) Prior Publication Data

US 2007/0082568 A1 Apr. 12, 2007

(30) Foreign Application Priority Data

Sep. 26, 2005 (JP) ............................. 2005-278296

(51) Int. Cl.
*B63H 21/22* (2006.01)
*B63H 11/00* (2006.01)
(52) U.S. Cl. ............................................. 440/1; 440/38
(58) Field of Classification Search .................. 440/1, 440/38, 40–43, 47, 88 A; 123/319, 336, 123/338, 339.1
See application file for complete search history.

(56) References Cited

U.S. PATENT DOCUMENTS 3,982,507 A * 9/1976 Asaka et al. ................. 123/322
4,398,513 A * 8/1983 Tanasawa et al. ........... 123/255

FOREIGN PATENT DOCUMENTS

JP 2002-303170 A 10/2002

* cited by examiner

*Primary Examiner*—Jesus Sotelo
*Assistant Examiner*—Daniel V Venne
(74) *Attorney, Agent, or Firm*—Birch, Stewart, Kolasch & Birch, LLP

(57) ABSTRACT

A jet-propelled watercraft capable of maintaining a propulsion force required for a turn made at the same time as closing of a throttle valve. The jet-propelled watercraft has an auxiliary intake valve and an ECU. The auxiliary intake valve in an intake pipe opens/closes an auxiliary intake passage to bypass a throttle valve. The ECU performs control such that an opening of the auxiliary intake valve in a state where the rotation speed of the engine is not lower than a threshold value is larger than the opening of the auxiliary intake valve in a state where the engine is idling. When in a state where the rotation speed is not lower than the threshold value, it is detected that the throttle valve is completely closed and that a steering mechanism has been turned by a prescribed angle or more, a current opening of the auxiliary intake valve is maintained.

20 Claims, 5 Drawing Sheets

JET-PROPELLED WATERCRAFT

CROSS-REFERENCE TO RELATED APPLICATION

The present application claims priority under 35 U.S.C. §119 to Japanese Patent Application No. 2005-278296, filed Sep. 26, 2005, the entire contents of which are hereby incorporated by reference.

BACKGROUND OF THE INVENTION

1 Field of the Invention

The present invention relates to a jet-propelled watercraft which obtains a propulsion force by discharging a water jet from a nozzle and which can turn its hull by swinging the nozzle to the left and right.

2 Description of Background Art

A jet-propelled watercraft is configured to obtain a propulsion force by discharging a water jet and change the direction of its hull by changing the direction of the water jet. It cannot change its direction when no water jet is discharged. When a rider driving such a jet-propelled watercraft gets around an obstacle, he or she tends to slow down the watercraft and, at the same time, change the direction of the watercraft by turning its handlebar. Closing the throttle valve by releasing the throttle lever so as to slow down the watercraft, however, stops the water jet making the watercraft unable to change its direction. A jet-propelled watercraft, therefore, requires a configuration in which, when the watercraft is making a turn, a water jet required to enable the watercraft to turn is maintained even if the throttle valve of the watercraft is completely closed.

A known method to maintain a propulsion force of a water jet even when the throttle valve is completely closed and the handlebar is turned is to use a configuration in which, even when operation to close the throttle valve is performed, the throttle valve is kept open for a prescribed amount of time to allow a water jet to be discharged (see JP-A No. 2002-303170, for example).

There are, however, problems with a configuration in which, when operations to close the throttle valve and to turn the watercraft are performed at the same time, the throttle valve is kept open for a prescribed amount of time. Namely, such a configuration requires a fuel injection device with a complicated configuration, and a control unit to control such operations also becomes complicated.

SUMMARY AND OBJECTS OF THE INVENTION

The present invention has been made in view of the problems, and it is an object of the present invention to provide a jet-propelled watercraft which can maintain, using a simple configuration, a propulsion force required to enable the watercraft to turn when a turning operation is performed at the same time as an operation to close the throttle valve.

To address the problems, the jet-propelled watercraft according to the present invention discharges a water jet using an engine, obtains a propulsion force from the water jet, and controls turning by changing the direction of the water jet. The jet-propelled watercraft includes an intake pipe for supplying air to the engine, a throttle valve which is provided in the intake pipe and adjusts an amount of the air, an auxiliary intake passage which is connected to the intake pipe and provides bypassing of the throttle valve, an auxiliary intake valve which opens and closes the auxiliary intake passage, a rotation speed sensor which detects a rotation speed of the engine, and a control unit which controls opening and closing of the auxiliary intake valve. The control unit performs control such that an opening of the auxiliary intake valve in a state where the rotation speed detected by the rotation speed sensor is not lower than a prescribed threshold value is larger than the opening of the auxiliary intake valve in a state where the engine is idling.

The jet-propelled watercraft according to the present invention preferably includes a steering mechanism which changes the direction of the water jet responding to operation of a handlebar, a steering detection mechanism which detects turning of the handlebar out of a position for a straight run, and a throttle sensor which detects an opening of the throttle valve. The control unit preferably performs control such that, in a state where the rotation speed is not lower than the threshold value, when the throttle sensor detects either that the throttle valve is completely closed or that an opening of the throttle valve has been reduced to be not larger than a prescribed value and the steering detection mechanism detects turning of the handlebar out of the position for a straight run, a current opening of the auxiliary intake valve is maintained.

Furthermore, it is preferable that the control unit performs control such that, when the steering detection mechanism detects returning of the handlebar to the position for a straight run, the opening of the auxiliary intake valve is reduced at a prescribed reduction rate so that a degree of opening for causing the engine to idle is reached. Or, it is preferable that the control unit performs control such that: after the current opening of the auxiliary intake valve is maintained for a prescribed amount of time as a result of detecting, in a state where the rotation speed is not lower than the threshold value, either that the throttle valve is completely closed or that the opening thereof has been reduced to be not larger than a prescribed value and that the handlebar has been turned out of the position for a straight run; the opening of the auxiliary intake valve is reduced at a prescribed reduction rate so that the degree of opening for causing the engine to idle is reached.

The jet-propelled watercraft according to the present invention preferably includes a steering mechanism which changes the direction of the water jet responding to operation of a handlebar, a steering detection mechanism which detects turning of the handlebar out of a position for a straight run, and a throttle sensor which detects an opening of the throttle valve. It is preferable that the control unit performs control such that, when the throttle sensor detects either that the throttle valve is completely closed or that the opening thereof has been reduced to be not larger than a prescribed value and the steering detection mechanism detects that the handlebar is in a position for an approximately straight run, the opening of the auxiliary intake valve is reduced for a while so that the degree of opening for causing the engine to idle is reached.

When the jet-propelled watercraft of the present invention is configured as described above, attaching the auxiliary intake valve to the auxiliary intake passage used to supply air required to enable the engine to run idle and controlling the opening of the auxiliary intake valve makes it possible to perform, based on a simple configuration, control (referred to as the "OTS control") for maintaining a propulsion force required to make a turn. Furthermore, keeping the auxiliary intake valve wide open when the rotation speed of the engine is equal to or larger than a prescribed value can prevent the rotation speed of the engine from dropping to substantially below the idling rotation speed of the engine even when the throttle valve is rapidly closed.

When the throttle valve is closed and the handlebar is turned simultaneously, the opening at that time of the auxiliary intake valve is maintained, so that a transition to the OTS control can be made smoothly without requiring any special device to obtain a propulsion force required to make a turn.

When the handlebar is subsequently returned to a position for a straight run, the opening of the auxiliary intake valve is reduced at a prescribed reduction rate, so that it is possible to smoothly exit from the OTS control. Or, maintaining the opening of the auxiliary intake valve for a prescribed amount of time and then reducing the opening of the auxiliary intake valve at a prescribed reduction rate enables the rotation speed of the engine to automatically drop to the idling rotation speed after a required turn is made. In this way, a feeling of driving similar to that obtained when the rider closes the throttle valve can be obtained.

When the throttle valve is completely closed or the opening thereof has been reduced to be equal to or smaller than a prescribed value in a state in which the handlebar has not been turned, reducing the opening of the auxiliary intake valve so as to cause, using feedback of the rotation speed of the engine, the rotation speed to drop to the idle rotation speed makes it possible to smoothly put the engine in an idle state.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5A is a diagram showing an opening of the throttle valve, FIG. 5B is a diagram showing a state of the steering signal, FIG. 5C is a diagram showing an opening of the auxiliary intake valve, and FIG. 5D is a diagram showing the engine rotation speed; FIG. 6A is a diagram showing an opening of the throttle valve, FIG. 6B is a diagram showing a state of the steering signal, FIG. 6C is a diagram showing an opening of the auxiliary intake valve, and FIG. 6D is a diagram showing the engine rotation speed.

DETAILED DESCRIPTION OF THE PREFERRED EMBODIMENTS

Figure 1:
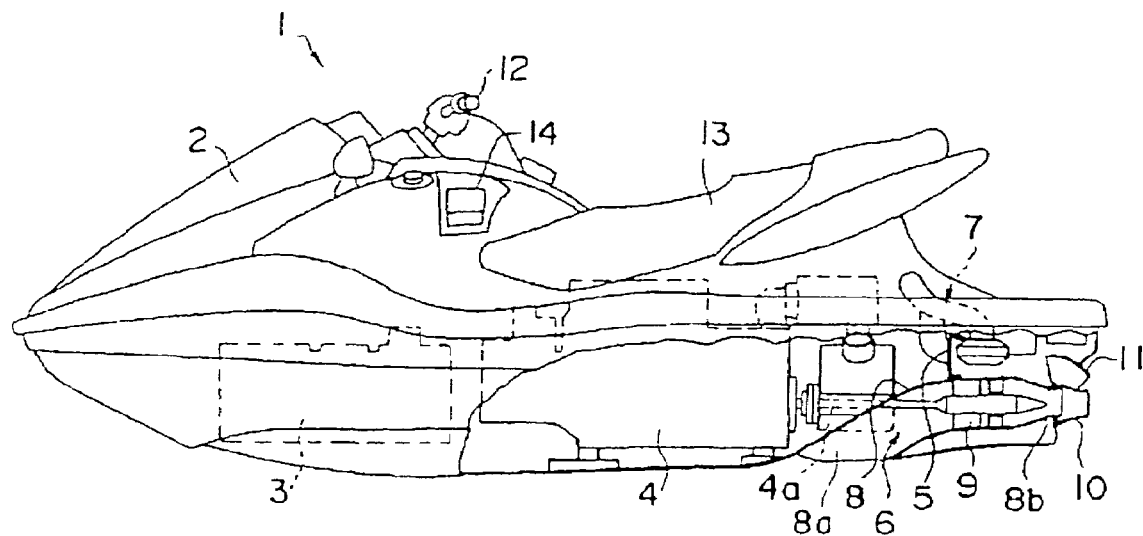
FIG. 1 is a side view of a jet-propelled watercraft according to the present invention.
Figure 2:
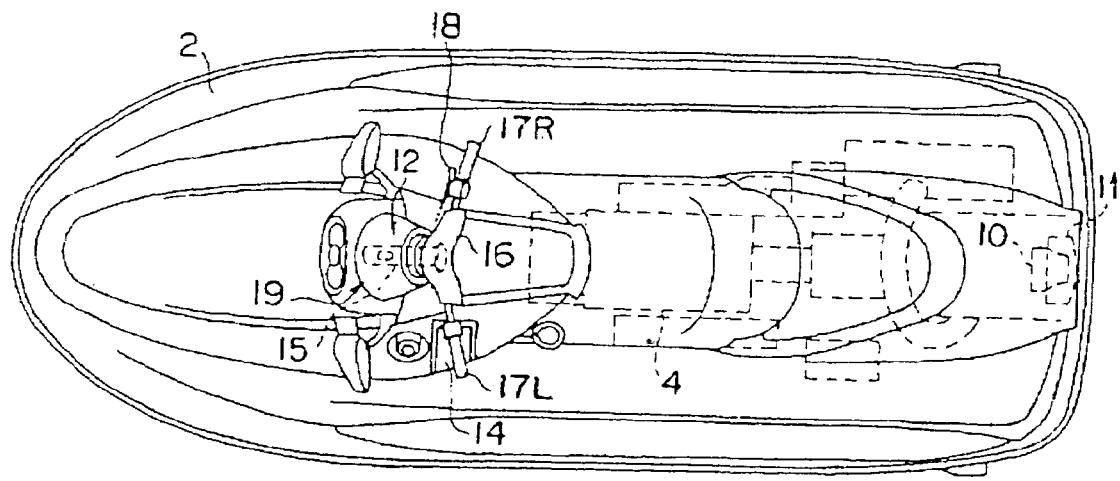
FIG. 2 is a plan view of the jet-propelled watercraft according to the present invention.

A preferred embodiment of the present invention will be described in the following with reference to the accompanying drawings. First, an overall configuration of a jet-propelled watercraft according to the present embodiment will be described with reference to FIGS. 1 and 2. A jet-propelled watercraft 1 includes a hull 2 and the following parts provided inside the hull 2: a fuel tank 3 disposed in a front area, an engine 4 disposed rearward of the fuel tank 3, a pump room 5 disposed rearward of the engine 4, a jet propeller 6 provided in the pump room 5, and an exhaust unit 7 with an intake side attached to the engine 4 and an exhaust side attached to the pump room 5. There are a steering mechanism 12 provided upward of the engine 4 and a seat 13 provided rearward of the steering mechanism 12 and above the hull 2. A rider to drive the jet-propelled watercraft 1 straddles the seat 13 and operates the steering mechanism 12.

The jet propeller 6 is communicated with a water intake 8a having an opening in the bottom of the hull 2 and extends rearwardly inside the water intake 8a. The jet propeller 6 includes a housing section 8 which includes a space having an opening in a rear portion of the hull 2, an impeller 9 rotatably installed in the space of the housing 8, and a steering nozzle 10 fixed to an opening portion 8b provided at a rear end of the housing section 8. The impeller 9 is connected to a drive shaft 4a of the engine 4. When the engine 4 is driven, the impeller 9 rotates and water is taken in through the water intake 8a. The water thus taken in is discharged from the steering nozzle 10 as a water jet rearwardly of the hull 2, thereby generating a propulsion force.

The steering mechanism 12 includes a steering shaft 15 rotatably connected to the hull 2, a handlebar 16 fixed to an upper end of the steering shaft 15, a pair of right and left handle grips 17R and 17L fit over right and left end portions of the handlebar 16, a throttle lever 18 fixed to an inner end portion of the right handle grip 17R, and a steering detection mechanism 19 fixed to a lower end of the steering shaft 15.

The steering nozzle 10 is installed to be laterally swingable relative to the housing section 8. When the handlebar 16 of the steering mechanism 12 is turned in either direction out of its position for a straight run, the steering nozzle 10 is swung in the corresponding direction to change the direction in which the water jet is discharged. This makes it possible to control the turning direction of the hull 2. A reverse basket 11 is vertically swingable fixed to a rear end portion of the housing section 8. By operating a control knob 14 provided in a portion near the steering mechanism 12 of the hull 2, the reverse basket 11 can be swung rearwardly into a position where the reverse basket 11 opposes the steering nozzle 10 from behind. The reverse basket 11 in that position directs the water jet discharged from the steering nozzle 10 forwardly and downwardly causing the hull 2 to run backwardly.

Figure 3:
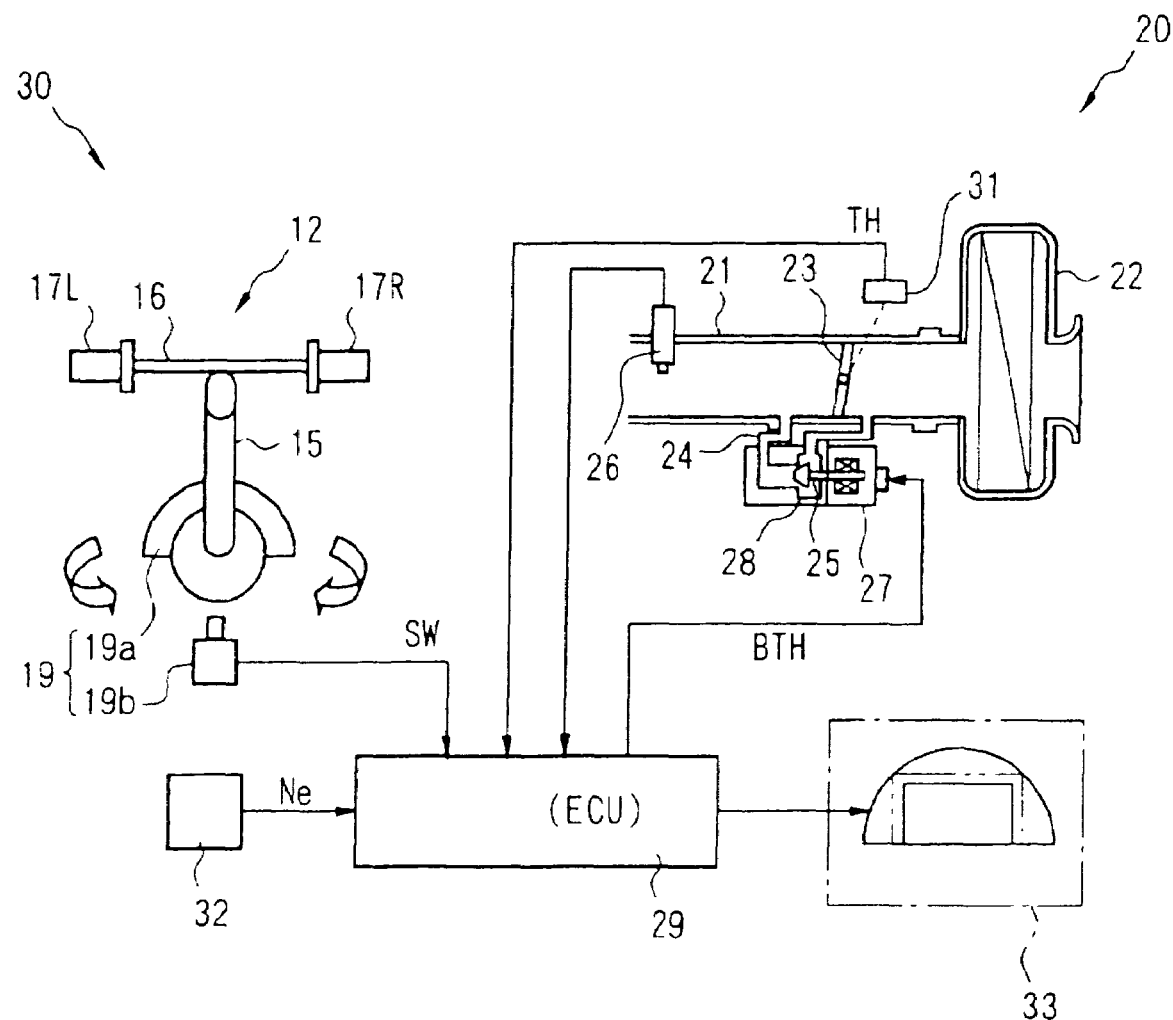
FIG. 3 is a block diagram of an OTS control system.

Next, a configuration of a fuel injection device 20 which injects fuel into the engine 4 of the jet-propelled watercraft 1 will be described with reference to FIG. 3. The fuel injection device 20 includes an intake pipe 21 one end of which is connected to an intake port of the engine 4, an air cleaner 22 disposed at the other end of the intake pipe 21, a throttle valve 23 which is set in the intake pipe 21 and adjusts air intake, an auxiliary intake passage 24 connected, in the vicinity of the throttle valve 23, to the intake pipe 21 to allow bypassing the throttle valve 23, an auxiliary intake valve 25 attached to the auxiliary intake passage 24, and an injector 26 provided in a portion, which is near the intake port of the engine 4, of the intake pipe 21. The auxiliary intake valve 25 is connected to a stepping motor (two-phase excitation type) 27. The auxiliary intake valve 25 moves toward or away from a valve seat 28 depending on the direction of rotation of the stepping motor 27 and thereby causes the auxiliary intake passage 24 to open or close. With the fuel injection device 20 configured as described above, air having passed the air cleaner 22 is, after undergoing flow adjustment by the throttle valve 23 and the auxiliary intake valve 25, mixed with fuel injected by the injector 26 and fed to the engine 4.

In the fuel injection device 20, the opening of the throttle valve 23 is adjusted by the throttle lever 18 of the steering mechanism 12. The amount of fuel injected by the injector 26 and the timing of the fuel injection are controlled by an engine control unit (hereinafter referred to as the "ECU 29"). The auxiliary intake valve 25 is not closed beyond a prescribed minimum opening (referred to as the "idle opening). This is to allow the engine 4 to be running (idling) even when the throttle valve 23 is completely closed. Namely, even when the throttle valve 23 is completely closed, air is supplied to the engine 4 via the auxiliary intake passage 24.

The jet-propelled watercraft 1 configured as described above is mounted with an OTS (Off Throttle Steering system) control system 30. The OTS control system 30 makes it possible to maintain a prescribed magnitude of water jet which is required to allow the watercraft 1 to turn even if the throttle valve 23 is completely closed while the watercraft 1 is running. The OTS control system 30 will be described in the following. The OTS control system 30 includes the ECU 29, the steering detection mechanism 19, a throttle sensor 31 which detects an opening TH of the throttle valve 23, a rotation speed sensor 32 which detects a rotation speed Ne of the engine 4, the stepping motor 27, and a display device 33. When required, depending on the opening TH of the throttle valve 23 and whether or not the handlebar 16 of the steering mechanism 12 is being operated to make a turn, the stepping motor 27 is controlled so as to adjust the opening BTH of the auxiliary intake valve 25 and maintain a prescribed magnitude of water jet. When the ECU 29 is engaged in OTS control, a relevant indication appears on the display device 33.

The steering detection mechanism 19 includes a switch cam 19a connected to a lower end of the steering shaft 15 and a switch 19b which is pressed by the switch cam 19a. When the handlebar 16 is turned in either direction out of its position for an approximately straight run and the steering shaft 15 is caused to turn a prescribed angle or more in the corresponding direction, the switch cam 19a presses the switch 19b. A resultant output (hereinafter referred to as the "steering signal SW") of the switch 19b is inputted to the ECU 29.

The OTS control by the ECU 29 will be described with reference to FIG. 4. The ECU 29 executes an OTS process 100 shown in FIG. 4 repeatedly at prescribed intervals. In the OTS process, the engine rotation speed Ne, the opening TH of the throttle valve 23, and the position of the stepping motor 27 (namely, the opening BTH of the auxiliary intake valve 25) are controlled. To control the position of the stepping motor 27, the steering signal SW of the steering detection mechanism 19 is used.

In the OTS process 100, first, whether or not the engine rotation speed Ne is equal to or larger than a prescribed threshold value Nth is determined (step S101). When the engine rotation speed Ne is smaller than the threshold value Nth, the opening BTH of the auxiliary intake valve 25 is set to the idle opening Lo (step S102) and the current process ends. When, in step S101, the engine rotation speed Ne is equal to or larger than the threshold value Nth, the opening BTH of the auxiliary intake valve 25 is controlled to be larger than the idle opening Lo (such an opening is referred to as the "active opening Hi") (step S103). Next, whether or not the throttle valve 23 is completely closed, that is, whether or not the opening TH of the throttle valve 23 is 0 is determined (step S104). When the opening TH is not 0, the current process ends. When, in step S 104, the opening TH is determined to be 0, whether or not the steering signal SW is on (whether or not the steering mechanism 12 has been turned by a prescribed angle or more) is determined (step S105). An arrangement may be made such that the throttle valve 23 is determined to be completely closed when the opening TH is equal to or smaller than a prescribed value.

When, in step S105, the steering signal SW is determined to be on, turning off of the steering signal SW is waited for (step S106). When the steering signal SW turns off (when the handlebar 16 is returned to its position for an approximately straight run), the opening BTH of the auxiliary intake valve 25 is reduced, at a prescribed reduction rate, to the idle opening Lo (step S107) and the current process ends. On the other hand, when, in step S105, the steering signal SW is determined to be off, the opening BTH of the auxiliary intake valve 25 is controlled, by using feedback of the rotation speed Ne of the engine 4 (this control is referred to as the "idle feedback control"), until the idle opening Lo is reached so that the rotation speed Ne is reduced to an idle rotation speed NO (step S 108), and the current process ends.

Next, the condition of the engine 4 during the time the OTS control is performed will be described. First, the condition of the engine 4 during the time when the throttle valve 23 is closed and the handlebar 16 is turned causing the steering shaft 15 to turn a prescribed angle or more will be described with reference to FIGS. 5. In a state in which the throttle valve 23 is closed (TH=0) with the engine 4 being active, the engine 4 is running at the idle rotation speed NO with the opening BTH of the auxiliary intake valve 25 set to Lo (at time t0.

When, at time t1, the throttle valve 23 is opened, the engine rotation speed Ne rises. When the engine rotation speed Ne reaches or exceeds the threshold value Nth, the opening BTH of the auxiliary intake valve 25 is set to the active opening Hi causing the engine 4 to rotate at a rotation speed N2. Subsequently, when, at time t2, the throttle valve 23 is completely closed and the handlebar 16 is turned, the steering signal SW turns on. At this time, the opening BTH of the auxiliary intake valve 25 is kept at the active opening Hi, so that the engine 4 runs at a rotation speed N1 which is larger than the idle rotation speed NO. In this state, a water jet is discharged from the steering nozzle 10 making it possible to turn the hull 2. When, at time t3, the handlebar 16 is returned to its position for an approximately straight run, the steering signal SW turns off causing the opening BTH to be reduced to the idle opening Lo at a prescribed reduction rate. As a result, the engine 4 enters a state of idling and, at time t4, the propulsion force reaches 0 and the hull 2 stops.

As described above, in a state where, with the engine rotation speed Ne being equal to or larger than the prescribed threshold value Nth, the auxiliary intake valve 25 is set to the active opening Hi that is larger than the idle opening Lo, even if the throttle valve 23 is rapidly closed, more air than supplied when the engine 4 is idling is supplied via the auxiliary intake passage 24, so that the engine rotation speed Ne is prevented from dropping to substantially below the idle rotation speed N0. This prevents stalling of the engine 4, so that the engine 4 can be stably operated.

Maintaining the opening BTH of the auxiliary intake valve 25 at the active opening Hi until the handlebar 16 that has been operated for a turn is returned to its position for an approximately straight run makes it possible, without requiring any special device, to obtain a water jet required for the hull 2 to make a turn. If, when the above operation is made, the opening BTH of the auxiliary intake valve 25 is set at the idle opening Lo, it becomes necessary to open the auxiliary intake valve 25 to increase the rotation speed Ne of the engine 4, that has dropped to the idle rotation speed N0 as a result of closing of the throttle valve 23, to the rotation speed N1 required to make a turn. This generates an operational time lag. However, with the auxiliary intake valve 25 set to the active opening Hi as described above, a transition into OTS mode can be achieved smoothly. Furthermore, when the throttle valve 23 is completely closed, the OTS mode can be exited smoothly by returning the auxiliary intake valve 25 gradually to the idle opening Lo.

Next, with reference to FIGS. 6, the condition of the engine 4 in a state where, with the throttle valve 23 closed, the handlebar 16 is not in a position for a turn will be described. What happens up to time t2 in this case is the same as described above with reference to FIGS. 5, so that what happens after time 2 is reached will be described in the following.

Figure 6A:
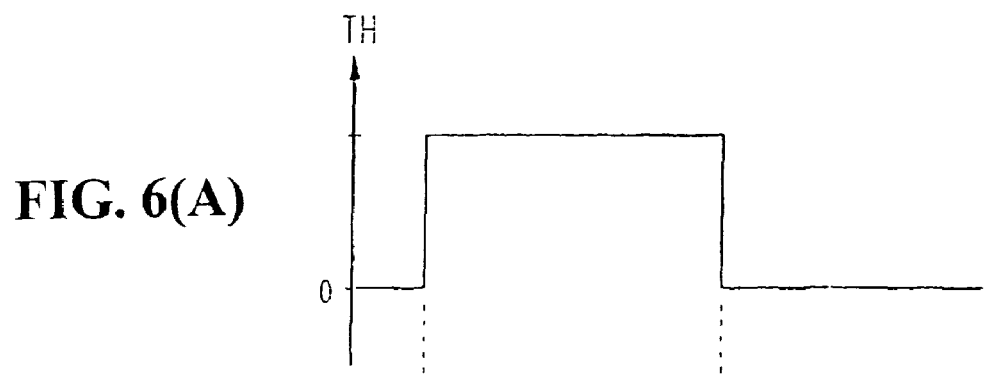
FIGS. 6A-D show diagrams for describing the OTS control performed when steering has not been made with the throttle valve closed.
Figure 6B:
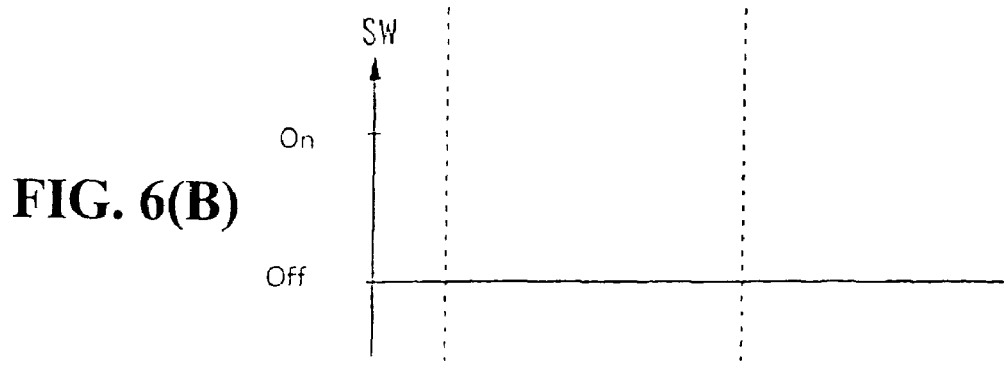
Figure 6C:
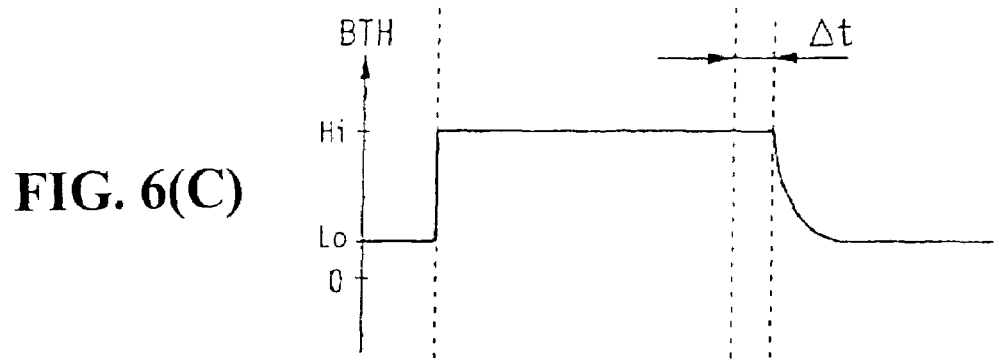
Figure 6D:
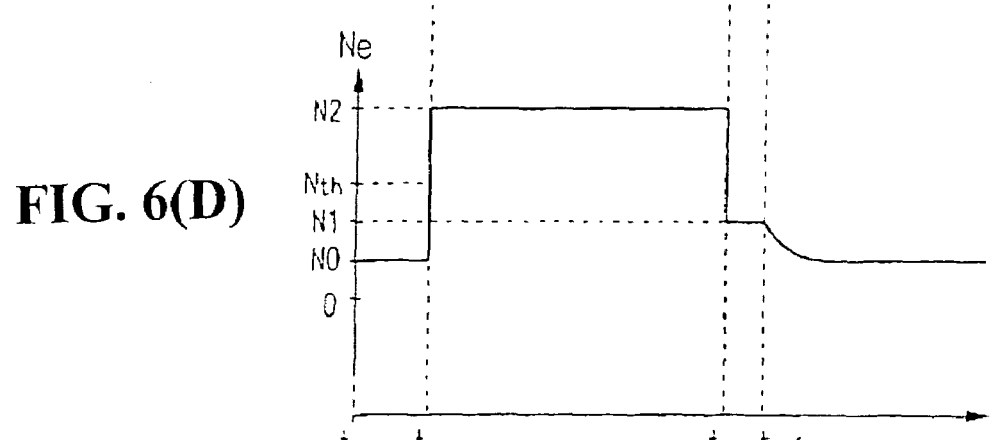

When, at time t2, the throttle valve 23 is completely closed, since the steering signal SW is off in the present case (the handlebar 16 is not in a position for a turn), the opening BTH of the auxiliary intake valve 25 is, by using feedback of the engine rotation speed Ne, i.e. by idle feedback control, set to the idle opening Lo so as to reduce the engine rotation speed Ne to the idle rotation speed N0. An arrangement may be made such that, in step S105, whether or not the steering signal SW is on is determined not immediately after the throttle valve 23 is closed but after a pause of a prescribed time Δ (i.e. determination is started at time t3') as shown in FIG. 6C. Such an arrangement allows the time lag between closing of the throttle valve 23 and turning of the handlebar 16 to be absorbed by the pause.

As described above, even in a case where, with the handlebar 16 not positioned for a turn, no propulsion force for a turn is required, adjusting the opening BTH of the auxiliary intake valve 25 by idle feedback control so as to reduce the rotation speed Ne of the engine 4 to the idle rotation speed N0 prevents the engine rotation speed Ne from dropping excessively and therefore enables a smooth transition.

Figure 4:
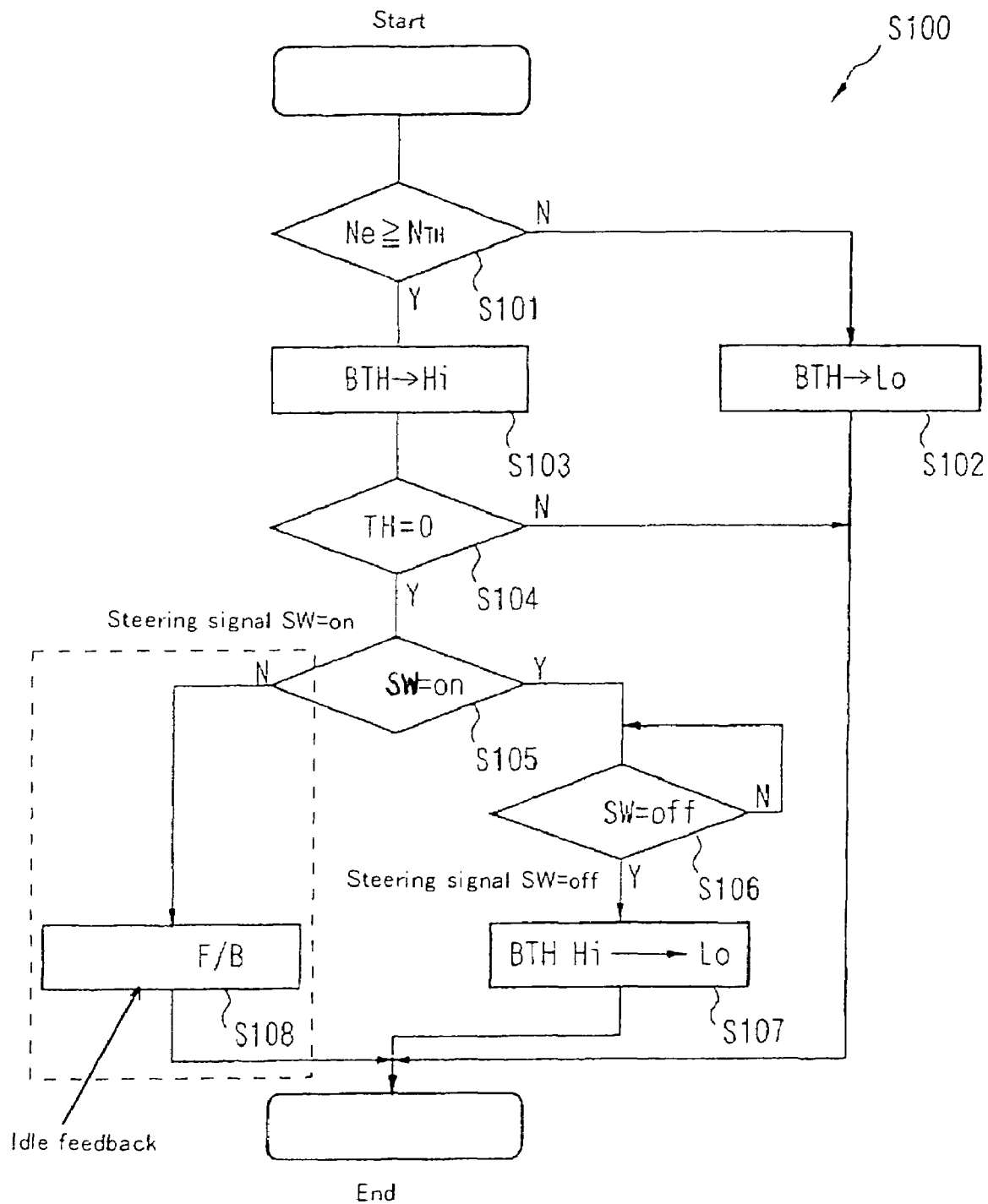
FIG. 4 is a flowchart showing an OTS control process.
Figure 5A:
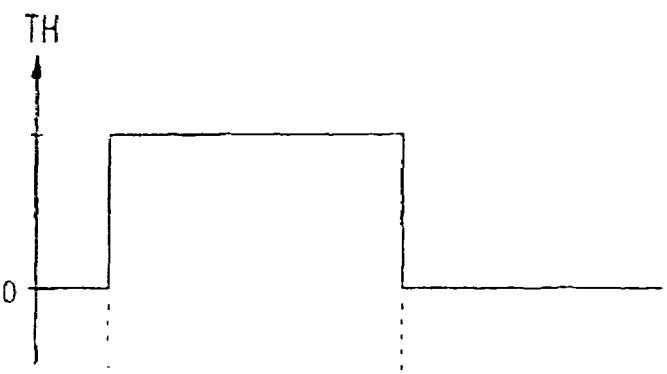
FIGS. 5A-D show diagrams for describing the OTS control performed when steering is made with the throttle valve closed.
Figure 5B:
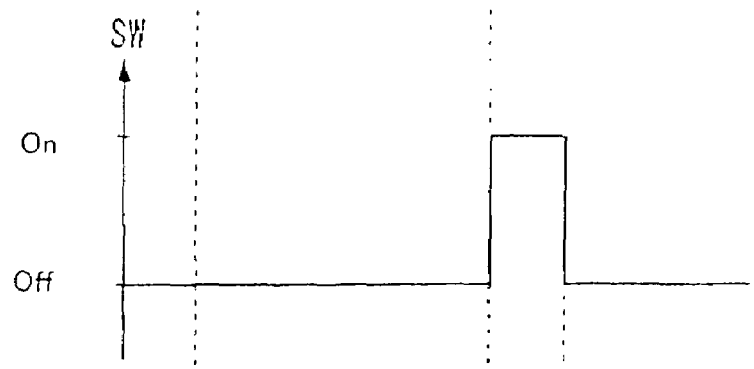
Figure 5C:
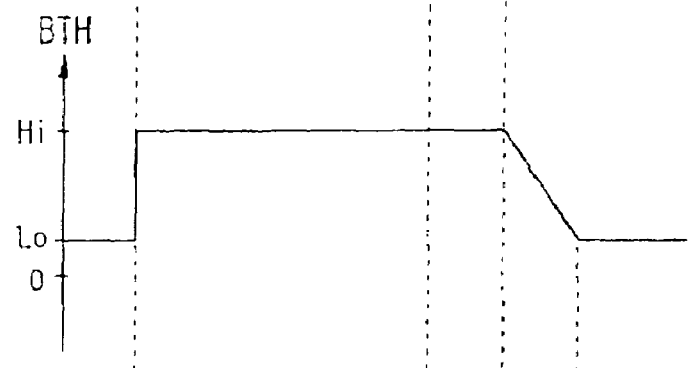
Figure 5D:
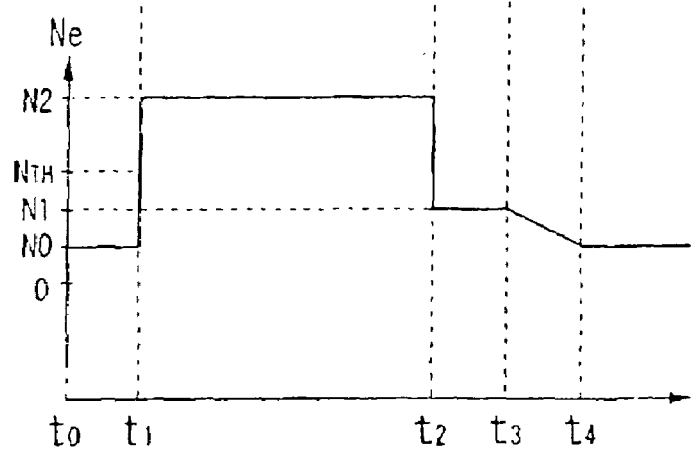

In the OTS process S100 shown in FIG. 4, the opening BTH of the auxiliary intake valve 25 is kept at the active opening Hi until the handlebar 16 is returned to its position for an approximately straight run in step S106, but a different arrangement may be made so that, after a passage of a prescribed amount of time, the opening BTH of the auxiliary intake valve 25 is reduced to the idle opening Lo regardless of the position of the handlebar 16. When such an arrangement is made, the rotation speed Ne of the engine 4 is automatically reduced to the idle rotation speed N0 after a required turn is made, so that a feeling of driving similar to that obtained when the rider closes the throttle valve 23 using the throttle lever 18 can be obtained.

As described in the foregoing, providing the auxiliary intake passage 24 that allows the engine 4 of the jet-propelled watercraft 1 to run idle with the auxiliary intake valve 25 and controlling the opening thereof makes it possible to perform the OTS control in a simple configuration.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A jet-propelled watercraft which discharges a water jet using an engine, obtains a propulsion force from the water jet, and controls turning by changing a direction of the water jet, comprising:
   an intake pipe for supplying air to the engine;
   a throttle valve which is provided in the intake pipe and adjusts an amount of the air;
   an auxiliary intake passage which is connected to the intake pipe and provides bypassing of the throttle valve;
   an auxiliary intake valve which opens and closes the auxiliary intake passage;
   a rotation speed sensor which detects a rotation speed of the engine; and
   a control unit which controls opening and closing of the auxiliary intake valve,
   wherein the control unit performs control such that an opening of the auxiliary intake valve in a state where the rotation speed detected by the rotation speed sensor is not lower than a prescribed threshold value is larger than the opening of the auxiliary intake valve in a state where the engine is idling.

2. The jet-propelled watercraft according to claim 1, further comprising:
   a steering mechanism which changes the direction of the water jet responding to operation of a handlebar;
   a steering detection mechanism which detects turning of the handlebar out of a position for a straight run; and
   a throttle sensor which detects an opening of the throttle valve,
   wherein the control unit performs control such that, in a state where the rotation speed is not lower than the threshold value, when the throttle sensor detects either that the throttle valve is completely closed or that the opening thereof has been reduced to be not larger than a prescribed value and the steering detection mechanism detects turning of the handlebar out of the position for a straight run, a current opening of the auxiliary intake valve is maintained.

3. The jet-propelled watercraft according to claim 2, wherein the control unit performs control such that, when the steering detection mechanism detects returning of the handlebar to the position for a straight run, the opening of the auxiliary intake valve is reduced at a prescribed reduction rate so that a degree of opening for causing the engine to idle is reached.

4. The jet-propelled watercraft according to claim 2, wherein the control unit performs control such that:
   after the current opening of the auxiliary intake valve is maintained for a prescribed amount of time as a result of detecting, in a state where the rotation speed is not lower than the threshold value, either that the throttle valve is completely closed or that the opening thereof has been reduced to be not larger than a prescribed value, and that the handlebar has been turned out of the position for a straight run; the opening of the auxiliary intake valve is reduced at a prescribed reduction rate so that a degree of opening for causing the engine to idle is reached.

5. The jet-propelled watercraft according to claim 1, further comprising:
   a steering mechanism which changes the direction of the water jet responding to operation of a handlebar;

a steering detection mechanism which detects turning of the handlebar out of a position for a straight run; and a throttle sensor which detects an opening of the throttle valve, wherein the control unit performs control such that, when the throttle sensor detects either that the throttle valve is completely closed or that the opening thereof has been reduced to be not larger than a prescribed value and the steering detection mechanism detects that the handlebar is in a position for an approximately straight run, the opening of the auxiliary intake valve is reduced for a while so that a degree of opening for causing the engine to idle is reached.

6. The jet-propelled watercraft according to claim 2, wherein the steering detection mechanism includes a switch cam connected to a lower end of a steering shaft and a switch which is pressed by the switch cam.

7. The jet-propelled watercraft according to claim 1, the auxiliary intake valve is connected to a stepping motor, and is adapted to move toward or away from a valve seat depending on a direction of rotation of the stepping motor, thereby causing the auxiliary intake passage to open or close.

8. The jet-propelled watercraft according to claim 2, when the handlebar is not positioned for a turn, no propulsion force for a turn is required, and the control unit is adapted to adjust the opening of the auxiliary intake valve by idle feedback control so as to reduce the rotation speed of the engine to a predetermined idle rotation speed, thereby preventing the engine rotation speed from dropping excessively.

9. The jet-propelled watercraft according to claim 2, further comprising a display device for displaying an indication that the control unit is adapted to execute an Off Throttle Steering Process.

10. The jet-propelled watercraft according to claim 5, wherein the control unit performs control such that, when the steering detection mechanism detects returning of the handlebar to the position for the approximately straight run, the opening of the auxiliary intake valve is reduced at a prescribed reduction rate so that the degree of opening for causing the engine to idle is reached.

11. A jet-propelled watercraft which discharges a water jet using an engine, obtains a propulsion force from the water jet, and controls turning by changing a direction of the water jet, comprising:

a fuel injection device having an intake pipe for supplying air to the engine, one end of the intake pipe being connected to the engine;

an air cleaner disposed at an opposite end of the intake pipe a throttle valve which is provided in the intake pipe and adjusts an amount of the air;

an auxiliary intake passage which is connected to the intake pipe and provides bypassing of the throttle valve;

an auxiliary intake valve which opens and closes the auxiliary intake passage;

a rotation speed sensor which detects a rotation speed of the engine; and a control unit which controls opening and closing of the auxiliary intake valve, wherein the control unit performs control such that an opening of the auxiliary intake valve in a state where the rotation speed detected by the rotation speed sensor is not lower than a prescribed threshold value is larger than the opening of the auxiliary intake valve in a state where the engine is idling.

12. The jet-propelled watercraft according to claim 11, further comprising:

a steering mechanism which changes the direction of the water jet responding to operation of a handlebar;

a steering detection mechanism which detects turning of the handlebar out of a position for a straight run; and a throttle sensor which detects an opening of the throttle valve, wherein the control unit performs control such that, in a state where the rotation speed is not lower than the threshold value, when the throttle sensor detects either that the throttle valve is completely closed or that the opening thereof has been reduced to be not larger than a prescribed value and the steering detection mechanism detects turning of the handlebar out of the position for a straight run, a current opening of the auxiliary intake valve is maintained.

13. The jet-propelled watercraft according to claim 12, wherein the control unit performs control such that, when the steering detection mechanism detects returning of the handlebar to the position for a straight run, the opening of the auxiliary intake valve is reduced at a prescribed reduction rate so that a degree of opening for causing the engine to idle is reached.

14. The jet-propelled watercraft according to claim 12, wherein the control unit performs control such that:

after the current opening of the auxiliary intake valve is maintained for a prescribed amount of time as a result of detecting, in a state where the rotation speed is not lower than the threshold value, either that the throttle valve is completely closed or that the opening thereof has been reduced to be not larger than a prescribed value, and that the handlebar has been turned out of the position for a straight run; the opening of the auxiliary intake valve is reduced at a prescribed reduction rate so that a degree of opening for causing the engine to idle is reached.

15. The jet-propelled watercraft according to claim 11, further comprising:

a steering mechanism which changes the direction of the water jet responding to operation of a handlebar;

a steering detection mechanism which detects turning of the handlebar out of a position for a straight run; and a throttle sensor which detects an opening of the throttle valve, wherein the control unit performs control such that, when the throttle sensor detects either that the throttle valve is completely closed or that the opening thereof has been reduced to be not larger than a prescribed value and the steering detection mechanism detects that the handlebar is in a position for an approximately straight run, the opening of the auxiliary intake valve is reduced for a while so that a degree of opening for causing the engine to idle is reached.

16. The jet-propelled watercraft according to claim 12, wherein the steering detection mechanism includes a switch cam connected to a lower end of a steering shaft and a switch which is pressed by the switch cam.

17. The jet-propelled watercraft according to claim 11, the auxiliary intake valve is connected to a stepping motor, and is adapted to move toward or away from a valve seat depending on a direction of rotation of the stepping motor, thereby causing the auxiliary intake passage to open or close.

18. The jet-propelled watercraft according to claim 12, when the handlebar is not positioned for a turn, no propulsion force for a turn is required, and the control unit is adapted to adjust the opening of the auxiliary intake valve by idle feedback control so as to reduce the rotation speed of the engine to a predetermined idle rotation speed, thereby preventing the engine rotation speed from dropping excessively.

19. The jet-propelled watercraft according to claim 12, further comprising a display device for displaying an indication that the control unit is adapted to execute an Off Throttle Steering Process.

20. The jet-propelled watercraft according to claim 15, wherein the control unit performs control such that, when the steering detection mechanism detects returning of the handlebar to the position for the approximately straight run, the opening of the auxiliary intake valve is reduced at a prescribed reduction rate so that the degree of opening for causing the engine to idle is reached.

* * * * *